US012802221B2

(12) United States Patent
Souquet et al.

(10) Patent No.: US 12,802,221 B2
(45) Date of Patent: Nov. 17, 2026

(54) ULTRASONIC IMAGING DEVICE AND ULTRASONIC IMAGING SYSTEM

(71) Applicant: ESONIC MEDICAL TECHNOLOGY (BEIJING) CO., LTD., Beijing (CN)

(72) Inventors: Jacques Souquet, Aix-en-Provence (FR); Bin Le, Beijing (CN)

(73) Assignee: ESONIC MEDICAL TECHNOLOGY (BEIJING) CO., LTD., Beijing (CN)

( * ) Notice: Subject to any disclaimer, the term of this patent is extended or adjusted under 35 U.S.C. 154(b) by 156 days.

(21) Appl. No.: 18/873,348

(22) PCT Filed: Apr. 12, 2024

(86) PCT No.: PCT/CN2024/087362
§ 371 (c)(1),
(2) Date: Dec. 10, 2024

(87) PCT Pub. No.: WO2024/213075
PCT Pub. Date: Oct. 17, 2024

(65) Prior Publication Data
US 2025/0363627 A1 Nov. 27, 2025

(30) Foreign Application Priority Data
Apr. 12, 2023 (CN) ........................ 202310389268.8

(51) Int. Cl.
*G06T 7/00* (2017.01)
*G06T 1/20* (2006.01)
(Continued)

(52) U.S. Cl.
CPC .............. *G06T 7/0012* (2013.01); *G06T 1/20* (2013.01); *G06T 12/10* (2026.01); *G06T 12/30* (2026.01);
(Continued)

(58) Field of Classification Search
CPC ......... A61B 8/54; A61B 8/463; A61B 8/5207; A61B 8/0841; A61B 8/14; A61B 8/12;
(Continued)

(56) References Cited

U.S. PATENT DOCUMENTS 5,515,727 A * 5/1996 Miwa ................ G01N 29/4436 73/602
5,740,805 A * 4/1998 Dolazza .............. G01S 7/52026 600/442
2010/0305449 A1* 12/2010 Wegener ............... A61B 8/483 600/459

* cited by examiner

*Primary Examiner* — Alex Kok S Liew
(74) *Attorney, Agent, or Firm* — Bayramoglu Law Offices LLC

(57) ABSTRACT

Provided are ultrasonic imaging device and ultrasonic imaging system. Ultrasonic imaging device includes analog-to-digital processing unit, buffer storage unit, imaging processing unit GPU, and image processing module. Analog-to-digital processing unit includes first interface, multiple frequency mixer circuits, multiple filter circuits, multiple analog-to-digital conversion circuits, and second interface. First interface receives, in parallel, multiple analog radio frequency signals formed by ultrasonic waves sensed and returned by multiple sensors of probe. Second interface outputs multiple groups of digital IQ data. Buffer storage unit receives, buffers, and stores digital IQ data. Imaging processing unit GPU, at least in part and in parallel, performs imaging processing on digital IQ data, to respectively form multiple raw image data of multiple pixel points of multiple image lines in multiple image rows of image. Image processing module forms image data of ultrasonic imaging based on raw image data.

15 Claims, 5 Drawing Sheets

(51) Int. Cl.
*G06T 12/10* (2026.01)
*G06T 12/30* (2026.01)

(52) U.S. Cl.
CPC ............... *G06T 2207/10132* (2013.01); *G06T 2207/30104* (2013.01)

(58) Field of Classification Search
CPC ................ A61B 8/4483; A61B 8/4488; A61B 8/5223; A61B 8/4444; A61B 8/5246; A61B 8/56; A61B 8/461; A61B 8/483; A61B 8/085; A61B 8/145; A61B 8/469; A61B 2034/2063; A61B 8/4427; A61B 8/4477; A61B 8/488; A61B 2017/3413; A61B 5/0095; A61B 8/4416; A61B 8/5269; A61B 8/4494; G16H 30/40; G16H 50/20; G16H 40/63; G16H 30/20; G16H 50/30; G16H 80/00
See application file for complete search history.

ULTRASONIC IMAGING DEVICE AND ULTRASONIC IMAGING SYSTEM

CROSS REFERENCE TO THE RELATED APPLICATIONS

This application is the national phase entry of International Application No. PCT/CN2024/087362, filed on Apr. 12, 2024, which is based upon and claims priority to Chinese Patent Application No. 202310389268.8, filed on Apr. 12, 2023, the entire contents of which are incorporated herein by reference.

TECHNICAL FIELD

The present disclosure relates to the technical field of ultrasonic imaging, and specifically to an ultrasonic imaging device and an ultrasonic imaging system.

BACKGROUND

The ultrasonic imaging device is commonly used in medical imaging diagnosis. This device emits the ultrasonic wave to the human body and receives the echo signal, and the information of tissue inside the human body is obtained by the difference in the acoustic property of human tissues and organs, so as to perform disease diagnosis. The ultrasonic imaging is widely used in medical clinical diagnosis due to its advantages of low cost, no radiation, no invasiveness, and excellent portability and real-time performance.

The ultrafast ultrasonic imaging system transmits the plane wave that can cover the entire imaging area, and the data of the entire imaging area is acquired by once emitting and receiving. Compared to conventional focused ultrasonic imaging, the plane wave ultrasonic imaging reduces the number of times of ultrasonic waves emitted, which greatly improves the imaging frame rate.

However, the data acquisition speed of the ultrafast ultrasonic imaging system is fast, which results in high complexity and large data amounts for the back-end data processing, and in turn results in a lower speed of the ultrasonic imaging.

Therefore, it is necessary to propose an ultrasonic imaging solution to solve at least one technical problem in the related art.

SUMMARY

One object of the present disclosure is to provide a new technical solution for ultrasonic imaging.

The embodiments of the present disclosure provide an ultrasonic imaging device, including an analog-to-digital processing unit, a buffer storage unit, an imaging processing unit GPU, and an image processing module, wherein the analog-to-digital processing unit includes a first interface, a plurality of frequency mixer circuits, a plurality of filter circuits, a plurality of analog-to-digital conversion circuits, and a second interface, wherein the first interface is configured to receive in parallel a plurality of analog radio frequency signals formed by returned ultrasonic waves sensed by a plurality of sensors of a probe;

the plurality of frequency mixer circuits are separately configured to mix each analog radio frequency signal in the plurality of analog radio frequency signals, so as to obtain a plurality of first analog signals, wherein a first desired frequency band is lower than a frequency band of the radio frequency signals;

the plurality of filter circuits are separately configured to filter each first analog signal in the plurality of first analog signals, so as to obtain a plurality of second analog signals;

the plurality of analog-to-digital conversion circuits are separately configured to perform analog-to-digital conversion processing for the plurality of second analog signals, so as to obtain a plurality of groups of digital IQ data, wherein each group of IQ data includes an I data group and a Q data group, wherein each I data group includes a plurality of I data, and each Q data group includes a plurality of Q data;

the second interface is configured to output the plurality of groups of digital IQ data;

the buffer storage unit is configured to receive the plurality of digital IQ data and buffer and store the plurality of digital IQ data;

the imaging processing unit GPU is configured to receive the plurality of groups of digital IQ data from a buffer storage unit, and to at least partially perform the imaging processing in parallel for the plurality of groups of digital IQ data, so as to form a plurality of raw image data of a plurality of pixel points of a plurality of image lines in a plurality of image rows of an image respectively;

the image processing module is configured to receive the plurality of raw image data and to form image data of ultrasonic imaging based on the plurality of raw image data.

Optionally, the amount of the plurality of sensors is equal to a total amount of sensors of the probe.

Optionally, the amount of the plurality of image lines is smaller than the amount of the plurality of sensors.

Optionally, the plurality of groups of analog radio frequency signals are analog radio frequency signals acquired by the plurality of sensors in one emission/reception event respectively.

Optionally, the image processing module includes a central processing unit and a graphics processing module.

Optionally, the maximum imaging frame rate that can be reached based on imaging of the plurality of raw image data is larger than or equal to 3000 frames/s.

Optionally, the imaging processing unit GPU is further configured to generate hardness assessment information of the tissue in real time by using shear wave elastography.

Optionally, the hardness assessment information includes a tissue hardness graph, and the imaging processing unit GPU is further configured to combine a real-time gray-scale B-mode image with the tissue hardness graph.

Optionally, the imaging processing unit GPU is configured to generate dispersion assessment information of a viscous medium in real time, and to combine the dispersion assessment information with the hardness assessment information, so as to generate an image that both shows hardness and a viscosity.

Optionally, the imaging processing unit GPU is configured to compute ultra-sensitive Doppler data in real time based on the IQ data, and to combine the ultra-sensitive Doppler data with the gray-scale B-mode image, so as to form a plurality of quantitative spectral display images emitted after a time resolution of a Doppler signal is improved.

Optionally, the imaging processing unit GPU is configured to generate Doppler data based on the IQ data, and filter the Doppler data with a singular value decomposition, so as to differentiate between stationary scatterers and moving blood flow.

Optionally, the imaging processing unit GPU is further configured to perform plane wave composite imaging in real time based on the IQ data.

Optionally, the imaging processing unit GPU is further configured to combine the real-time gray-scale B-mode image with ultrasonic attenuation data, wherein the ultrasonic attenuation data is obtained from the plurality of groups of digital IQ data.

Optionally, the imaging processing unit GPU is further configured to combine the real-time gray-scale B-mode images with sound velocity data, wherein the sound velocity data is obtained from the plurality of groups of digital IQ data.

The embodiments of the present disclosure further provide an ultrasonic imaging system including:

- a probe, including an excitation device and a plurality of sensors, wherein the excitation device is configured to excite a shear wave in a tissue and emit an ultrasonic wave, and each of the sensors is configured to sense a returned ultrasonic to form a corresponding analog radio frequency signal;
- the ultrasonic imaging device according to the above embodiment of the present disclosure, configured to form image data of the ultrasonic imaging; and
- a display device, configured to display an image based on the image data.

In the ultrasonic imaging device and ultrasonic imaging system provided by the embodiments of the present disclosure, the plurality of analog radio frequency signals acquired by the plurality of sensors of the probe are processed into the plurality of groups of digital IQ data by the analog-to-digital processing unit; and then the GPU at least partially performs the imaging processing in parallel for the plurality of groups of digital IQ data, so as to obtain the plurality of raw image data of the plurality of image lines; and then the image processing module forms the image data of the ultrasonic imaging based on the plurality of raw image data. In this way, the real-time calculation of key parameters related to tissue performance can be realized in conjunction with the ultrafast ultrasonic wave acquisition, and after the analog radio frequency signal is acquired, the beam for the ultrasonic imaging can be synthesized in real time, so as to improve the speed of ultrasonic imaging.

Other features of the present disclosure and advantages thereof will become clear by the following detailed description of exemplary embodiments of the present disclosure with reference to the drawings.

BRIEF DESCRIPTION OF THE DRAWINGS

The drawings incorporated in and form a part of the specification show embodiments of the present disclosure and together with their description, are used to explain the principles of the present disclosure.

DETAILED DESCRIPTION OF THE EMBODIMENTS

Various exemplary embodiments of the present disclosure will now be described in detail with reference to the drawings. It should be noted that unless otherwise specified, the relative arrangement, numerical expressions, and values of the components and steps described in these embodiments do not limit the scope of the present disclosure.

The following description of at least one exemplary embodiment is in fact only illustrative and does not serve as any limitation on the present disclosure and its application or use.

The techniques, methods, and devices known to a person of ordinary skill in the relevant field may not be discussed in detail, but where appropriate, the techniques, methods, and devices should be considered as a part of the specification.

In all examples shown and discussed herein, any specific values should be interpreted as merely exemplary and not as limitations. Therefore, other examples of the exemplary embodiments may have different values.

It should be noted that similar symbols and letters denote similar items in the following drawings, so that once an item is defined in a drawing, no further discussion is required in the subsequent drawings.

The specific embodiments are described below according to the architecture of the ultrasonic imaging device provided by the embodiments of the present disclosure.

Figure 1:
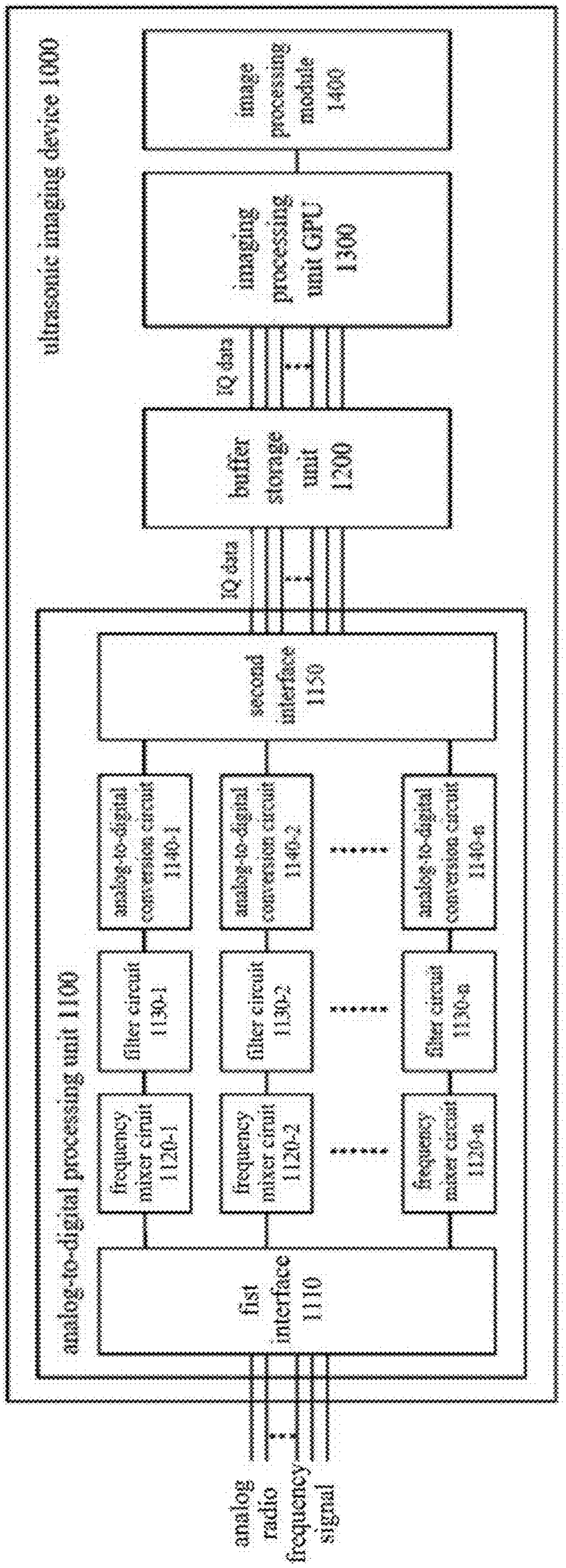
FIG. 1 shows a block diagram of an ultrasonic imaging device of an embodiment of the present disclosure.

The present embodiment provides an ultrasonic imaging device. As shown in FIG. 1, the ultrasonic imaging device 1000 can include an analog-to-digital processing unit 1100, a buffer storage unit 1200, an imaging processing unit GPU 1300, and an image processing module 1400, wherein the analog-to-digital processing unit 1100 can include a first interface 1110, a plurality of frequency mixer circuits 1120 (including frequency mixer circuits 1120-1, 1120-2, . . . 1120-*n*, where n is an integer larger than 1), a plurality of filter circuits 1130 (including filter circuits 1130-1, 1130-2, . . . 1130-*n*, where n is an integer larger than 1), a plurality of analog-to-digital conversion circuits 1140 (including analog-to-digital conversion circuits 1140-1, 1140-2, . . . 1140-*n*, where n is an integer larger than 1), and a second interface 1150.

The first interface 1110 is configured to receive in parallel a plurality of analog radio frequency signals formed by returned ultrasonic waves sensed by a plurality of sensors of a probe.

The plurality of frequency mixer circuits 1120 are separately configured to each analog radio frequency signal in the plurality of analog radio frequency signals, so as to obtain a plurality of first analog signals of a first desired frequency band, wherein the first desired frequency band is lower than a frequency band of the radio frequency signals.

The plurality of filter circuits 1130 are separately configured to filter each first analog signal in the plurality of first analog signals, so as to obtain a plurality of second analog signals.

The plurality of analog-to-digital conversion circuits 1140 are separately configured to perform analog-to-digital conversion processing for the plurality of second analog signals, so as to obtain a plurality of groups of digital IQ data, wherein each group of digital IQ data includes an I data group and a Q data group, wherein each I data group includes a plurality of I data, and each Q data group includes a plurality of Q data.

The second interface 1150 is configured to output the plurality of groups of digital IQ data.

The buffer storage unit 1200 is configured to receive the plurality of digital IQ data and buffer and store the plurality of digital IQ data.

The imaging processing unit GPU 1300 is configured to receive the plurality of groups of digital IQ data from the buffer storage unit 1200, and to at least partially perform the imaging processing for the plurality of groups of digital IQ data, so as to form a plurality of raw image data of a plurality of pixel points of a plurality of image lines in a plurality of image rows of an image respectively.

The image processing module 1400 is configured to receive the plurality of raw image data and to form the image data of the ultrasonic imaging based on the plurality of raw image data.

In the embodiment, the first interface 1110 can be connected to the probe, wherein the probe includes an excitation device and a plurality of sensors, wherein the excitation device is configured to excite a shear wave in a tissue and emit ultrasonic wave, and the plurality of sensors is configured to sense a returned ultrasonic to form a corresponding analog radio frequency signal, wherein the returned ultrasonic wave is an ultrasonic wave reflected or scattered by reflective particles in human tissue.

The sensor can convert the returned mechanical power ultrasonic wave to the electrical power analog radio frequency signal, which is convenient for processing.

Optionally, in one example, the probe can include the plurality of sensors, and the sensors acquiring the analog radio frequency signal and transmitting the analog radio frequency signal to the frequency mixer circuit via the first interface in the embodiment can be some or all of the sensors included in the probe.

In one embodiment of the present disclosure, the probe can include N sensors, and correspondingly, the analog-to-digital processing unit 1100 can include N frequency mixer circuits 1120, N filter circuit 1130, and N analog-to-digital conversion circuits 1140. The sensors in the probe, the frequency mixer circuit 1120, the filter circuit 1130, and the analog-to-digital conversion circuit 1140 are in one-to-one correspondence. In the analog-to-digital processing unit 1100, each filter circuit 1130 is connected to the corresponding frequency mixer circuit 1120 and the analog-to-digital conversion circuit 1140, and each frequency mixer circuit 1120 can process the analog radio frequency signal acquired by the corresponding sensor.

Any one of the frequency mixer circuits 1120 can mix the analog radio frequency signals obtained by the corresponding sensor, so as to obtain the first analog signal of the first desired frequency band.

In one example, as for mixing the analog radio frequency signal to obtain the plurality of first analog signals of the first desired frequency band, the mixed analog signal can be obtained by multiplying $e^{2\pi ft}$ by the analog radio frequency signal; and then filtering the mixed analog signal is filtered according to the first desired frequency band, so as to obtain the first analog signal, wherein f is a frequency of the ultrasonic wave and t is a transmission duration of the ultrasonic wave.

Specifically, the analog I signal and the analog Q signal can be obtained through that the analog radio frequency signal multiplies sin (2πft) and cos (2πft); and then the analog I signal and the analog Q signal are filtered according to the first desired frequency band respectively, so as to obtain the first analog signal.

That is to say, the first analog signal can include the analog I signal of the first desired frequency band and the analog Q signal of the first desired frequency band.

In the embodiment, the first desired frequency band can be preset according to the application scenario or specific demands. For example, the frequency of the first desired frequency band can be smaller or equal to the frequency of the ultrasonic wave.

The filter circuit 1130 performs a filter treatment for the first analog signal obtained by the corresponding frequency mixer circuit 1120, so as to obtain the second analog signal.

In the embodiment, the filter treatment for the first analog signal can remove the high-frequency harmonic component in the first analog signal.

Specifically, the second analog signal including the analog I signal of the first desired frequency band after filtered and the analog Q signal of the first desired frequency band after filtered can be obtained by performing the filter processing on the analog I signal of the first desired frequency band and the analog Q signal of the first desired frequency band respectively.

The analog-to-digital conversion circuit 1140 can perform an analog-to-digital conversion processing for the second analog signal obtained by the corresponding filter circuit 1130, so as to obtain a group of digital IQ signals.

Optionally, in one example, the analog-to-digital conversion circuit 1140 can perform the analog-to-digital conversion processing on the filtered analog I signal of the first desired frequency band and the filtered analog Q signal of the first desired frequency band respectively, so as to obtain an I data group and a Q data group.

The second interface 1150 can output the plurality of groups of digital IQ data in parallel. The buffer storage unit 1200 can be, for example, a random access memory (RAM).

Imaging Processing Unit GPU 1300 is a GPU (Graphics Processing Unit), which is a microprocessor that specializes in the image and graphic-related operations. The imaging processing unit GPU 1300 at least partially performs the imaging processing for the plurality of digital IQ data, i.e., the imaging processing unit GPU 1300 can perform the imaging processing for at least two groups of digital IQ data at the same time, wherein the imaging processing can at least include the beam forming processing.

After the imaging processing unit GPU 1300 performs the imaging processing for the plurality of digital IQ data, a plurality of raw image data of a plurality of pixel points of a plurality of image lines in a plurality of image rows of one image can be obtained.

Specifically, the probe can include N sensors, so that one image can include N image lines, and each image line can include at least one image column. Additionally, one image can further include a plurality of image rows, and any one image row includes one pixel point on any one image column. Therefore, any one image row includes at least one pixel point in one image line.

Optionally, in one example, when one image line includes m image columns, any one image row can include m pixel point in one image line, wherein m is a positive integer.

Further, any one raw image data obtained by the present disclosure corresponds to m pixel points of one image row and one image line.

In the embodiment, the image processing module 1400 can perform the visual processing according to the plurality of raw image data to form the image data of the ultrasonic imaging, so that the display device displays the image based on the image data of the ultrasonic imaging.

Further, the image of the image data based on the ultrasonic imaging can be a SWE (shear wave elastography) image and/or a gray-scale B-mode image.

In the ultrasonic imaging device of the embodiment, the plurality of analog radio frequency signals acquired by the plurality of sensors of the probe are processed into the plurality of groups of digital IQ data by the analog-to-digital processing unit; and then the GPU at least partially performs the imaging processing in parallel for the plurality of groups of digital IQ data, so as to obtain the plurality of raw image data of the plurality of image lines; and then the image processing module forms the image data of the ultrasonic imaging based on the plurality of raw image data. In this way, the real-time calculation of key parameters related to tissue performance can be realized in conjunction with the ultrafast ultrasonic wave acquisition, and after the analog radio frequency signal is acquired, the beam for the ultrasonic imaging can be synthesized in real time, so as to improve the speed of ultrasonic imaging.

In one embodiment of the present disclosure, the amount of the plurality of sensors is equal to a total amount of sensors of the probe.

That is to say, the plurality of sensors acquiring the analog radio frequency signal and transmitting the analog radio frequency signal to the frequency mixer circuit via the first interface in the embodiment can all sensors included in the probe.

In this way, the amount of analog radio frequency signals received by the first interface can be maximally improved, which in turn can maximally improve the amount of the plurality of groups of digital IQ data output by the analog-to-digital processing unit, so as to improve the resolution of the ultrasonic imaging.

In one embodiment of the present disclosure, the amount of the plurality of image lines is smaller than the amount of the plurality of sensors.

Specifically, when the imaging processing unit GPU performs the imaging processing on the plurality of groups of digital IQ data output by the analog-to-digital processing unit, it may discard some poor-quality IQ data and not perform the imaging processing on it. Therefore, it will not obtain the raw image data of the image line corresponding to the discarded IQ data.

By the embodiment, on the one hand, the quality of ultrasonic imaging can be improved, and on the other hand, the processing for the IQ data with low quality is avoided, which reduces the computing power occupation of GPU.

In one embodiment of the present disclosure, the plurality of groups of analog radio frequency signals are analog radio frequency signals acquired by the plurality of sensors in one emission/reception event respectively.

For the conventional ultrasonic imaging system, the excitation device triggers one shear wave in the tissue each time in one emission/reception event, the ultrasonic imaging system will simultaneously emit the ultrasonic wave and receive the echo by one emission-reception channel, and generate the image data of one image line according to the echo, wherein one emission-reception channel corresponds to one sensor of the probe, one frequency mixer circuit, one filter circuit, and one analog-to-digital conversion circuit.

Optionally, in order to obtain a complete image, N emission/reception events need to occur when the ultrasonic imaging system includes N emission-reception channels. The N emission/reception events will emit ultrasonic waves and receive echoes by different receiving channels, and generate image data of one image line according to the echo. After the N emission/reception events, the image data of N image lines can be obtained, and then the image is formed according to the image data of N image lines.

The ultrasonic imaging system of the embodiment includes the ultrasonic imaging device, the probe, and the display device of the embodiment. The ultrasonic imaging system of the embodiment adopts the plane wave scanning technique, the excitation device triggers a shear wave in the tissue in one emission/reception event, and at the same time the plurality of emission channels emit the pulsed ultrasonic wave with the wavefront shape of a plane, wherein the plane wave covers the entire imaging area during propagation. During the receiving process, the plurality of sensors receive echoes in the sound field by the plurality of receiving channels; the plurality of raw image data of the plurality of pixel points of the plurality of image lines in the plurality of image rows of one image are generated according to the received echo; and the image data of the ultrasonic imaging based on the plurality of raw image data is formed.

Optionally, the excitation device triggers one shear wave in the tissue each time in one emission/reception event, and at the same time all emission channels emit the pulsed ultrasonic wave with the wavefront shape of a plane, wherein the plane wave covers the entire imaging area during the propagation. During the receiving process, all sensors receive the echoes in the sound field by all receiving channels; the plurality of raw image data of the plurality of pixel points of all image lines in the plurality of image rows of one image are generated according to all echo; and the image data of the ultrasonic imaging based on the plurality of raw image data is formed.

In the embodiment, the ultrasonic imaging device of the embodiment performs the ultrasonic imaging processing for the analog radio frequency signal acquired by the plurality of sensors in one emission/reception event, so as to realize the ultrafast acquisition for the echo signal of the ultrasonic wave, which can reduce the duration required to form one image, and improve the speed of the ultrasonic imaging.

In one embodiment of the present disclosure, the image processing module 1400 includes a central processing unit and a graphics processing module.

The central processing unit (CPU for short) serves as the computing and control core of the computer system, and is the final execution unit of the information processing and program running.

The graphics processing module can be a graphics card, and specifically can be an integrated graphics card or an independent graphics card, which is not limited herein.

That is to say, the display processing in the embodiment can be realized by the CPU and the graphics processing module, rather than by the GPU.

In one embodiment of the present disclosure, the maximum imaging frame rate that can be reached based on the imaging of the plurality of raw image data is larger than or equal to 3000 frames/s.

Optionally, the maximum imaging frame rate that can be reached based on the imaging of the plurality of raw image data can be larger than or equal to 8000 frames/s.

Specifically, the ultrasonic imaging system of the embodiment can significantly improve the frame rate of ultrasonic imaging.

In one embodiment of the present disclosure, the imaging processing unit GPU1300 is further configured to generate the hardness assessment information of the tissue in real time by using the shear wave elastography.

The shear wave elastography (SWE) is a quantitative and elastic real-time imaging mode for showing the color-coded, and its map covers on the conventional gray-scale B-mode image. The interested region of the SWE image is divided by an interested region frame that the size and position can be controlled by the user.

The shear wave is a type of elastic wave that propagates in biological soft tissues at a very slow speed of about a few meters per second. The propagation speed of shear waves is directly related to the parameter assessing the elasticity, i.e., Young modulus. The propagation speed can be measured by triggering the shear wave in the tissue, and the elasticity value of the tissue can be calculated by using the following equation:

$$E = 3d * c_s^2,$$

wherein E is Young modulus and unit is kPa; $c_s$ is the propagation speed of the shear wave, and the speed is m/s; and d is the tissue density, and the unit is $kg/m^3$.

The speed of the shear wave velocity increases with the increase of the elasticity and with the increase of the hardness of the medium. Therefore, the hardness assessment information of the tissue can be generated in real time by utilizing the shear wave elastography.

A frame of B-mode images and a frame of SWE images are acquired orderly by using a unique pulse sequence. A frame of SWE image is usually obtained within 30-80 ms, and a frame of B-mode images is usually obtained within 10-100 ms. Each mode has its own frame rate. The frame rate of the signal is limited by the sound power and the probe temperature. The frame rate of the SWE usually can reach 2 Hz, and the frame rate of the B mode can reach 50 Hz.

In the embodiment, the step of shear wave elastography includes: triggering the shear wave in the tissue by the excitation device by utilizing the acoustic radiation force; acquiring a space-time displacement field generated by the propagation of the shear wave by using the longitudinal plane wave with high frame rate in conjunction with the one-dimensional Doppler imaging technique; and extracting a local assessment for the shear wave displacement by applying a specialized inverse process, and generating a two-dimensional elasticity graph in kPa.

As described above, the real-time shear wave elastography can be composed of two events: generating the push line of the shear wave; and emitting/receiving the plane wave, so as to perform the ultra-fast imaging for the propagation process of the shear wave.

The ultrasonic imaging device of the embodiment can sequentially obtain the SWE map and the B-mode image. Therefore, after obtaining the SWE map, the repeated B-mode image can be obtained several times.

Figure 2:
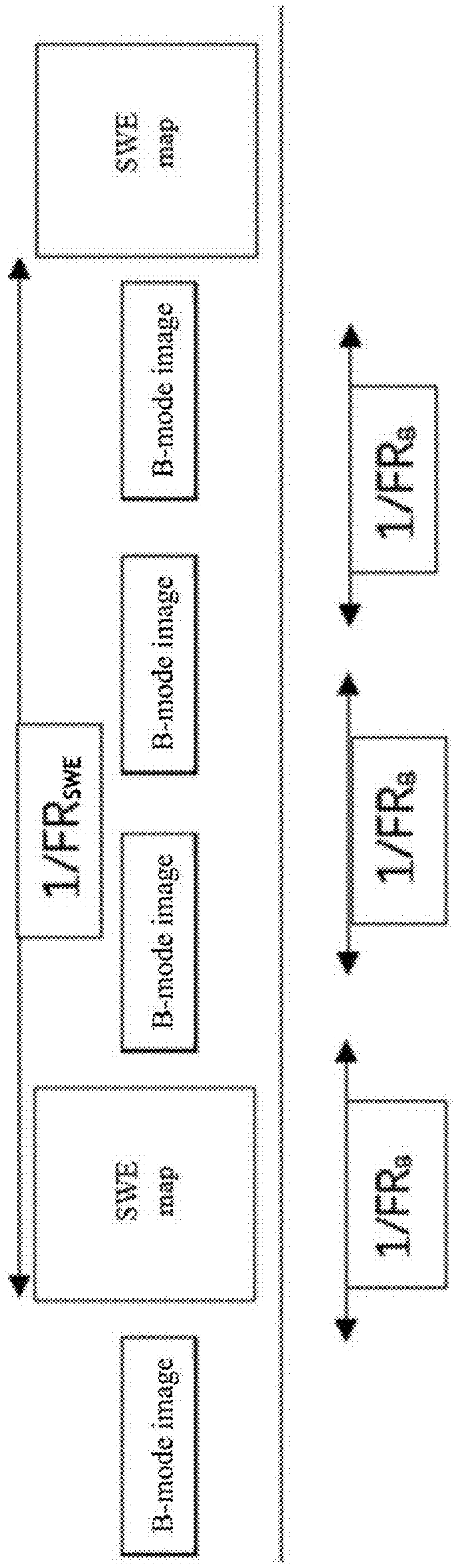
FIG. 2 shows a schematic diagram of an acquiring sequence of the SWE map and B-mode image of an embodiment of the present disclosure.

As shown in FIG. 2, the time difference between two neighboring acquired SWE maps is $1/FR_{SWE}$, wherein $FR_{SWE}$ is the frame rate of SWE mode; and the time difference between two neighboring acquired B-mode images is $1/FR_B$, wherein $FR_B$ is the frame rate of B-mode.

The step of emitting/receiving the plane wave, so as to perform the ultra-fast imaging for the propagation process of the shear wave mainly includes: the plane wave transmission of the detector sub-aperture centered on the interested region of the elastic imaging, i.e., receiving/recording the echo with a sub-aperture centered on the interested region; setting a digital finite shock response to obtain a narrow-band filter, wherein the voltage applied is the same as that applied on the B mode.

Figure 3:
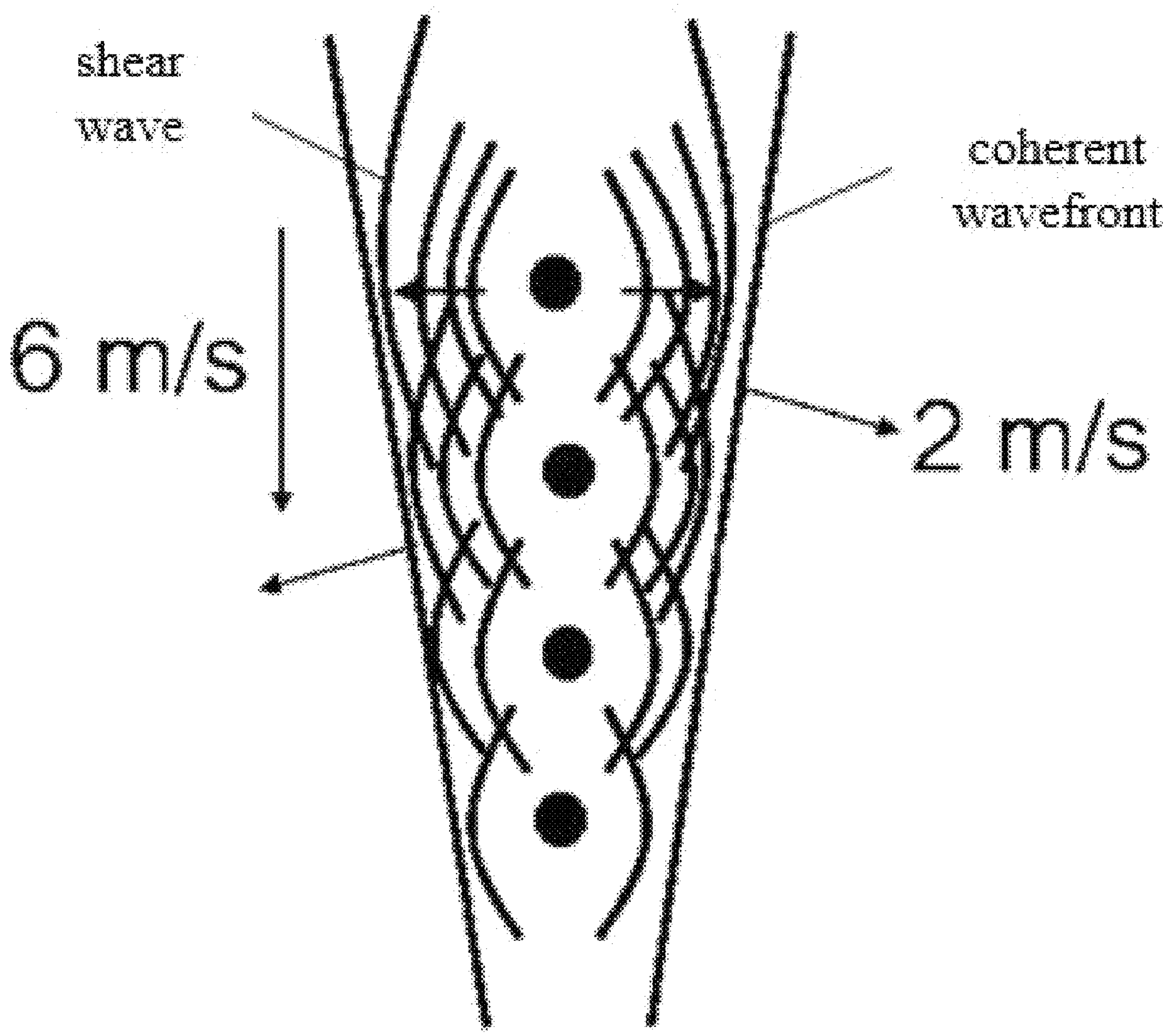
FIG. 3 shows a schematic diagram of propagation of a coherent wavefront and shear wave of an embodiment of the present disclosure.

During the process of triggering the shear wave in the tissue by utilizing the acoustic radiation force; the acoustic radiation force pushes the acoustic medium in the focal point in a direction away from the sensor. In order to induce the displacement of a few micrometers in soft tissues with the imaging probe, the length of the transmission pulse usually is 100 μs. In SWE mode, during the generation process of the shear wave, the focal point of the sensor shifts axially, so as to generate a large coherent wavefront in a direction of the sonic beam. The induced transient displacement propagates in the vertical direction in the form of shear waves, as shown in FIG. 3. The generated shear wave frequence is at an order of magnitudes of kilohertz, and propagates at speeds of several meters per second.

Specifically, as shown in FIG. 3, the propagation speed of the coherent wavefront can be 2 m/s, and the propagation direction can be perpendicular to the direction of the coherent wavefront, as shown by the corresponding arrow. The propagation speed of a shear wave can be 6 m/s, and the propagation direction can be the vertical direction, as shown by the corresponding arrow. The circles in FIG. 3 can be reflective particles in the tissue.

Optionally, a plane wave can be used to capture the propagation of the shear wave. The plane wave can be propagated at a speed of, for example, 1540 m/s.

Generally speaking, in order to locally measure the propagation speed of the shear wave with a resolution of 1 mm, it needs a frame rate of several thousand frames per second. For example, if a shear wave propagates at a speed of 3 m/s, the propagation delay between two points with a spacing of 1 mm is 0.3 ms. Therefore, in order to measure these two points, the frame rate of the ultrafast ultrasonic imaging should be 3000 frames per second.

In the embodiment, the shear wave generated by the probe will propagate parallel to the surface of the probe, and the propagation speed is measured by estimating the time delay of the Doppler signal of the shear wave between two points located at the same depth. In the entire interested region, it can obtain the speed of the shear wave and transmit it to the elasticity value of the tissue.

Since the propagation outside the shear wave push line is only several millimeters, the shear wave push line can be moved transversely for measuring a larger area, and the process of generation and processing can be repeated. Meanwhile, all subgraphs obtained from the elastic measurement are combined together to form a large elastic graph.

Optionally, in one example, the push line can be optimized, so that the shear wave generated in the interested region is the best. The typical pulse burst length is about 50-200 μs, and it can mostly cover 200 sensors, so that it really requires very high instantaneous power.

Figure 4:
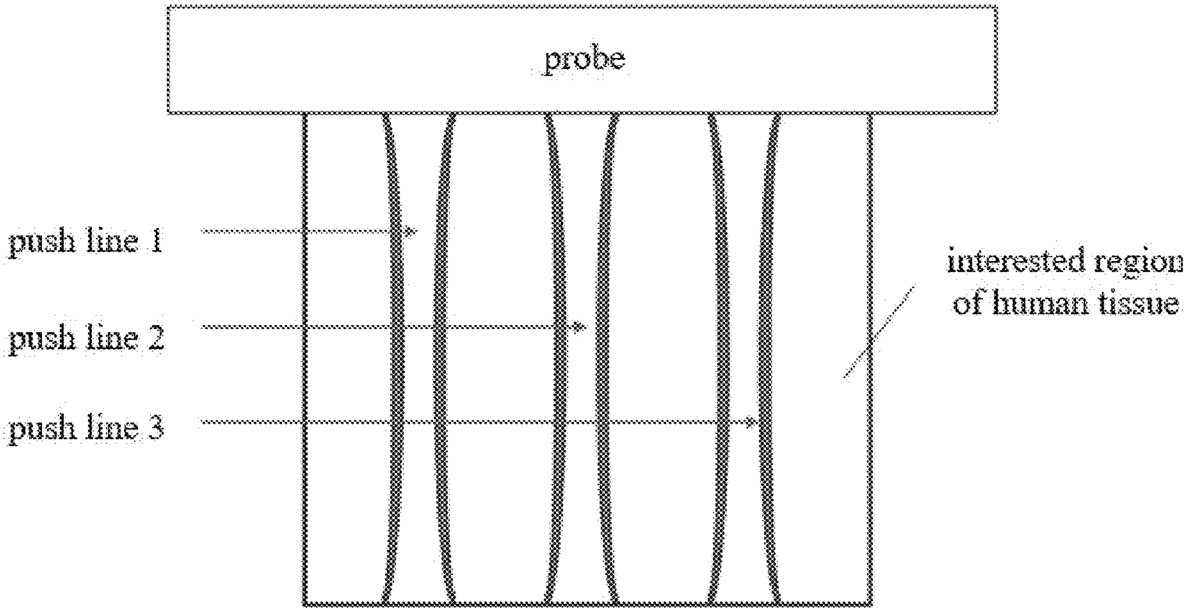
FIG. 4 shows a schematic diagram of a push line movement process of a shear wave of an embodiment of the present disclosure.

For a large elastic graph, a basic pattern consisted of a push line and ultrafast imaging is repeated at different lateral positions within the interested region. As shown in FIG. 4, the push line can move from the position of push line 1 to the position of push line 2, and then move to the position of push line 3.

The amount of push lines Npl of a single mapping can be defined as: Npl=(WidthROI)/(spacing of the push lines), wherein WidthROI is a width of the interested region.

The ultrafast acquisition of the planar ultrasonic wave is usually carried out for 10 ms after each beam of the push lines. In the ultrasonic imaging device of the embodiment, the GPU provides appropriate computing power to perform this ultra-fast plane wave imaging.

In one embodiment of the present disclosure, the hardness assessment information includes the tissue hardness graph. On this basis, the imaging processing unit GPU1300 can also be configured to combine the real-time gray-scale B-mode image with the tissue hardness graph.

In the embodiment, the ultra-fast ultrasonic imaging (the plane wave emission/reception event) can be used to combine the B-mode acquisition with shear wave acquisition. Since the beam synthesis is executed entirely in the GPU after obtaining the IQ data, the computing power of the GPU is a necessity to perform the function in real time.

The embodiment utilizes the computing power of the GPU to combine the real-time gray-scale B-mode image with the tissue hardness graph to synthesize the final image.

In one embodiment of the present disclosure, the imaging processing unit GPU 1300 is further configured to perform the plane wave composite imaging in real time based on the IQ data.

In the case of real-time composite imaging, a series of overlapping gray-scale B-mode images are rapidly obtained from different spatial directions, and then the detected gray-scale B-mode images are averaged and combined to form the composite image. This process will be repeated continuously in the entire the image field. Its main advantages are to reduce speckles and improve the contrast resolution, so that the definition of the interface is clearer.

The synthetic plane wave imaging is realized by transmitting plane waves at different angles, receiving scattered signals, and performing beam synthesis.

In one embodiment of the present disclosure, the imaging processing unit GPU 1300 can further be configured to generate dispersion assessment information of the viscous medium in real time, and to combine the dispersion assessment information with the hardness assessment information, so as to generate the image that both shows the hardness and the viscosity.

When the tissue is assumed to be purely elastic, the shear wave elastography can provide a quantitative elastic graph of the tissue. However, soft tissues have significant viscosity, which will lead to diffusion and attenuation of the shear wave generated by the acoustic radiation force under the shear wave elastography mode. In fact, the shear wave elastography generated by the acoustic radiation force has the broadband characteristic.

Figure 5:
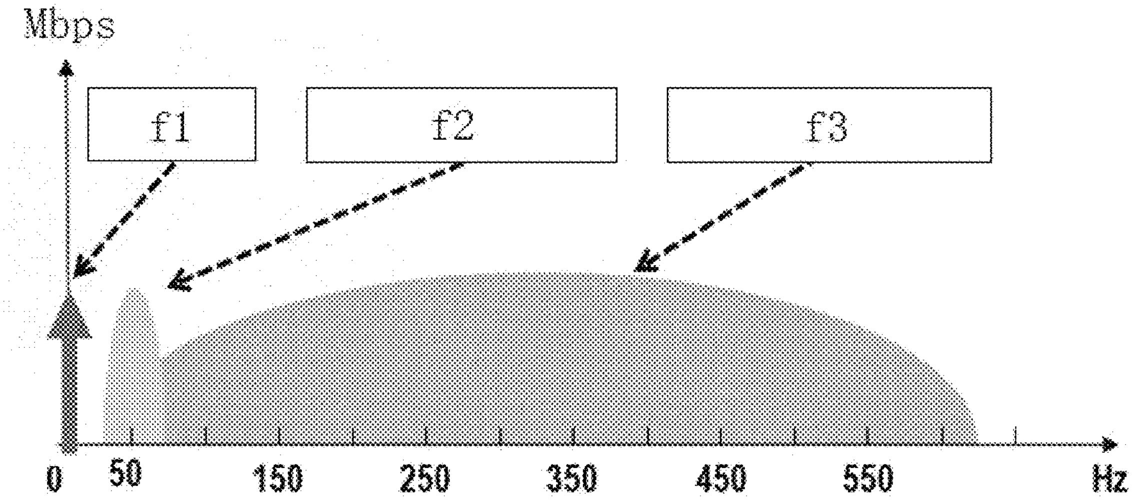
FIG. 5 shows a relationship curve between a shear wave frequency and frequency bandwidths of vibrations generated by tissues of an embodiment of the present disclosure.

As shown in FIG. 5, the vertical coordinate represents the frequency bandwidth generating the vibration, and the horizontal coordinate represents the frequency, wherein f1 shows a relationship curve between the shear wave frequency and the frequency bandwidth of vibrations generated by the tissue when the soft tissue is a non-adhesive tissue; f2 shows a relationship curve between the shear wave frequency and the frequency bandwidth of vibrations generated by the tissue in case of the tissue fibrosis; and f3 shows a relationship curve between the shear wave frequency and the frequency bandwidth of vibrations generated by the tissue when the soft tissue has significant viscosity.

In the case of non-viscous tissue, the propagation speed of the shear wave is independent of frequency, and the speed measured by ultrasonic imaging device is the group velocity, i.e., the speed that the energy of the shear wave moves. In this condition, the Hooker model can be used to calculate the diffusion and attenuation of the shear wave.

However, when the tissue is the homogeneous medium, the Kelvin-Voigt model can be used to calculate the diffusion and attenuation of the shear wave.

When measuring the stage of hepatic steatosis, measuring the shear wave diffusivity is very important because the viscosity of the liver increases with the amount of fat in the liver.

The shear wave diffusion imaging differs from shear wave elastography only in the processing of the space-time displacement field, and the data acquisition mode of the shear wave diffusion imaging is the same as the data acquisition mode of the shear wave elastography. When the tissue is the viscous medium, the phase velocity needs to be calculated as a function of the frequency for one given pixel point.

For a plane wave with a frequency of ω, the phase velocity $v_ø(\omega)$ can be defined as:

$$v_\phi(\omega) = sqrt((2(\mu^2 + \eta^2\omega^2)/(\rho(\mu + sqrt(\mu^2 + \eta^2\omega^2)),$$

wherein μ is the shear modulus and n is the viscosity.

By estimating a local slope of the phase velocity $v_ø(\omega)$, it can obtain that the diffusion value ø(ω) is in a frequency range. This diffusion value is measured in a unit of Pa.

In the embodiment, the image of shear wave diffusion imaging and the image of shear wave elastography can be displayed at the same time based on the computing power of the GPU.

In one embodiment of the present disclosure, the imaging processing unit GPU 1300 is configured to compute the ultra-sensitive Doppler data in real time based on the IQ data, and to combine the ultra-sensitive Doppler data with the gray-scale B-mode image, so as to form the plurality of quantitative spectral display images emitted after the time resolution of the Doppler signal is improved.

The ultrafast/ultra-sensitive Doppler uses a deflecting plane wave transmitted in the tissue. The plane wave triggers all scatterers in the tissue at the same time, so as to acquire higher sensitivity compared to the conventional Doppler. It is a duplex mode, wherein the color Doppler data is overlapped on the gray-scale B-mode image. However, unlike the conventional color Doppler that the color frame and the B-mode frame are acquired sequentially, the ultra-sensitive Doppler color plane wave emission is intertwined with the B-mode plane wave emission. Additionally, ultra-sensitive Doppler enhanced data improves the time resolution of the Doppler signal.

In one embodiment of the present disclosure, the imaging processing unit GPU1300 is configured to generate the Doppler data based on the IQ data, and filter the Doppler data with a singular value decomposition, so as to differentiate between stationary scatterers and moving blood flow.

In the embodiment, in order to eliminate the inherent clutter in Doppler analysis to provide higher sensitivity, the GPU generates the Doppler data based on the IQ data and performs the singular value decomposition filtering, so as to obtain the Doppler data of the stationary scatterers and the Doppler data of the flowing blood.

In one embodiment of the present disclosure, the imaging processing unit GPU1300 is further configured to combine the real-time gray-scale B-mode image with ultrasonic attenuation data, wherein the ultrasonic attenuation data is obtained from the plurality of groups of digital IQ data.

In the embodiment, the ultrasonic attenuation refers to the loss of ultrasonic energy in the medium, wherein the ultrasonic attenuation effect is related to the ultrasonic wave center frequency, and the ultrasonic attenuation will lead the ultrasonic wave center frequency to decrease. For the soft tissue, the transformation relationship between the ultrasonic attenuation parameter and the ultrasonic wave center frequency can be expressed as follows:

$$\alpha = \alpha_0 |f|^n,$$

wherein $\alpha_0$ is the attenuation coefficient in dB/cm/MHz, f is the frequency, and the value of n in soft tissues is generally between 0~2.

Exemplarily, the average attenuation coefficient value in a healthy human liver is about 0.5 dB/cm/MHz, and the increase of the liver fat due to pathology will lead the attenuation coefficient to increase.

After the interested region in the real-time gray-scale B-mode image is scanned and located, the plurality of digital IQ data is processed; and the ultrasonic wave center frequency is determined according to the plurality of digital IQ data, so as to determine the ultrasonic attenuation data according the transformation relationship between the ultrasonic attenuation parameter and the ultrasonic wave center frequency.

After obtaining the ultrasonic attenuation data, the ultrasonic attenuation data can be displayed in the interested region of the real-time gray-scale B-mode image, so as to indicate the fat condition in the interested region.

Exemplarily, a color box corresponding to the attenuation range can be displayed in the interested region of the real-time gray-scale B-mode image according to the attenuation range where the ultrasonic attenuation data is located.

In one embodiment of the present disclosure, the imaging processing unit GPU1300 is further configured to combine the real-time gray-scale B-mode image with the sound velocity data, wherein the sound velocity data is obtained from the plurality of groups of digital IQ data.

In the embodiment, the existence of fat affects the speed of the ultrasonic wave, wherein the average speed of the sound velocity value in the liver is about 1560 m/s, and the speed of the sound velocity value will decrease to 1480 m/s when the fat exists.

After the interested region in the real-time gray-scale B-mode image is scanned and located, the plurality of digital IQ data is processed, wherein the sound velocity data of the ultrasonic wave is determined by the plurality of groups of digital IQ data, and the sound velocity data is displayed in the interested region in the real-time gray-scale B-mode image, so as to indicate the fat condition in the interested region.

Exemplarily, a color box corresponding to the sound velocity range can be displayed in the interested region of the real-time gray-scale B-mode image according to the sound velocity range where the sound velocity data is located.

The ultrasonic attenuation data or the sound velocity data displayed in the real-time gray-scale B-mode image as described above can be used to non-invasively detect and quantify the presence and grade of the hepatic steatosis.

The specific embodiments are described below according to the structure of the ultrasonic imaging system provided by the embodiments of the present disclosure.

Figure 6:
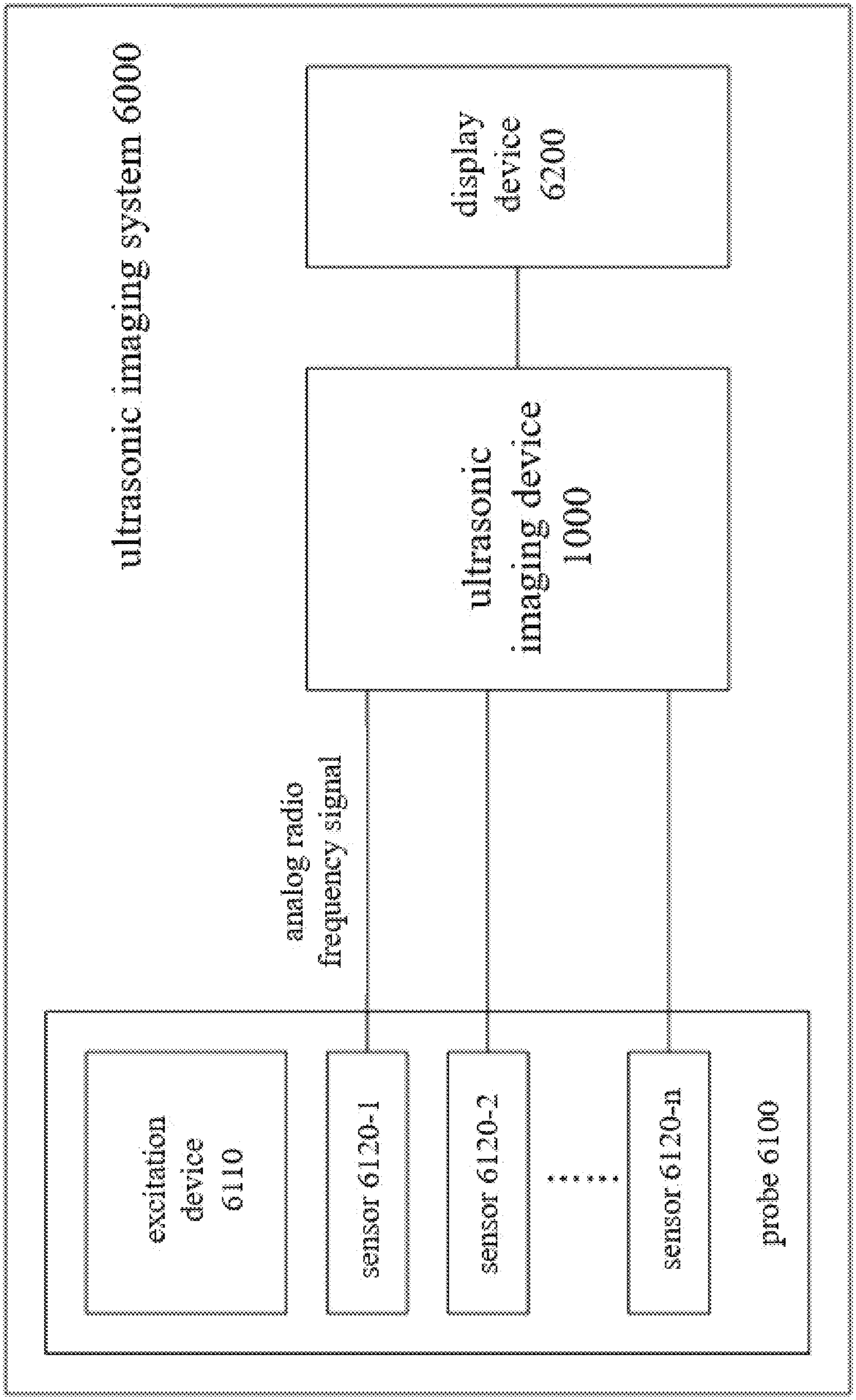
FIG. 6 shows a block diagram of an ultrasonic imaging system of an embodiment of the present disclosure.

The present embodiment further provides an ultrasonic imaging system. As shown in FIG. 6, the ultrasonic imaging system 6000 can include a probe 6100, the ultrasonic imaging device 1000 as described in any one of the foregoing embodiments, and the display device 6200.

The probe 6100 includes an excitation device 6110 and a plurality of sensors 6120 (including sensors 6120-1, 6120-2, . . . , **6120-*n*, wherein n is an integer larger than 1), wherein the excitation device 6110 is configured to excite the shear wave in the tissue and emit the ultrasonic wave, and each of the sensors 6120** is configured to sense the returned ultrasonic to form the corresponding analog radio frequency signal;

The ultrasonic imaging device 1000 is configured to form the image data of the ultrasonic imaging.

The display device 6200 is configured to display an image based on the image data.

Various embodiments of the present disclosure have been described above, and the foregoing description is exemplary, not exhaustive, and is not limited to the disclosed embodiments. Without deviating from the scope and spirit of the various embodiments illustrated, many modifications and changes are apparent to a person of ordinary skill in the art. The terms used herein are chosen to best explain the principles, practical applications, or the technical improvements in the market, or to make other persons of ordinary skill in the art to understand each embodiment disclosed herein. The scope of the present disclosure is limited by the appended claims.

INDUSTRIAL APPLICABILITY

By adopting the above solutions, the real-time calculation of the key parameters related to the tissue performance can be realized in conjunction with the ultrafast ultrasonic wave acquisition, and after the analog radio frequency signal is acquired, the beam for the ultrasonic imaging can be synthesized in real time, so as to improve the speed of ultrasonic imaging.

What is claimed is:

1. An ultrasonic imaging device, comprising an analog-to-digital processing unit, a buffer storage unit, an imaging processing unit GPU, and an image processing module, wherein the analog-to-digital processing unit comprises a first interface, a plurality of frequency mixer circuits, a plurality of filter circuits, a plurality of analog-to-digital conversion circuits, and a second interface, wherein the first interface is configured to receive in parallel a plurality of analog radio frequency signals formed by returned ultrasonic waves sensed by a plurality of sensors of a probe;

the plurality of frequency mixer circuits are separately configured to mix each analog radio frequency signal in the plurality of analog radio frequency signals to obtain a plurality of first analog signals of a first desired frequency band, wherein the first desired frequency band is lower than a frequency band of the plurality of analog radio frequency signals;

the plurality of filter circuits are separately configured to filter each first analog signal in the plurality of first analog signals to obtain a plurality of second analog signals;

the plurality of analog-to-digital conversion circuits are separately configured to perform an analog-to-digital conversion processing for the plurality of second analog signals to obtain a plurality of groups of digital IQ data, wherein each group of digital IQ data comprises an I data group and a Q data group, wherein the I data group comprises a plurality of I data, and the Q data group comprises a plurality of Q data;

the second interface is configured to output the plurality of groups of digital IQ data;

the buffer storage unit is configured to receive the plurality of groups of digital IQ data and buffer and store the plurality of groups of digital IQ data;

the imaging processing unit GPU is configured to receive the plurality of groups of digital IQ data from the buffer storage unit, and to at least partially perform an imaging processing in parallel for the plurality of groups of digital IQ data, to form a plurality of raw image data of a plurality of pixel points of a plurality of image lines in a plurality of image rows of an image respectively; and the image processing module is configured to receive the plurality of raw image data and to form image data of ultrasonic imaging based on the plurality of raw image data.

2. The ultrasonic imaging device according to claim 1, wherein an amount of the plurality of sensors is equal to a total amount of sensors of the probe.

3. The ultrasonic imaging device according to claim 2, wherein an amount of the plurality of image lines is smaller than the amount of the plurality of sensors.

4. The ultrasonic imaging device according to claim 1, wherein the plurality of analog radio frequency signals are acquired by the plurality of sensors in an emission/reception event respectively.

5. The ultrasonic imaging device according to claim 1, wherein the image processing module comprises a central processing unit and a graphics processing module.

6. The ultrasonic imaging device according to claim 1, wherein a maximum imaging frame rate is larger than or equal to 3000 frames/s, wherein the maximum imaging frame rate is allowed to be reached based on imaging of the plurality of raw image data.

7. The ultrasonic imaging device according to claim 1, wherein the imaging processing unit GPU is further configured to generate hardness assessment information of a tissue in real time by using shear wave elastography.

8. The ultrasonic imaging device according to claim 7, wherein the hardness assessment information comprises a tissue hardness graph, and the imaging processing unit GPU is further configured to combine a real-time gray-scale B-mode image with the tissue hardness graph.

9. The ultrasonic imaging device according to claim 7, wherein the imaging processing unit GPU is configured to generate dispersion assessment information of a viscous medium in real time, and to combine the dispersion assessment information with the hardness assessment information to generate an image, wherein the image shows both a hardness and a viscosity.

10. The ultrasonic imaging device according to claim 7, wherein the imaging processing unit GPU is configured to compute ultra-sensitive Doppler data in real time based on the plurality of groups of digital IQ data, and to combine the ultra-sensitive Doppler data with a gray-scale B-mode image to form a plurality of quantitative spectral display images emitted after a time resolution of a Doppler signal is improved.

11. The ultrasonic imaging device according to claim 7, wherein the imaging processing unit GPU is configured to generate Doppler data based on the plurality of groups of digital IQ data, and filter the Doppler data with a singular value decomposition to differentiate between stationary scatterers and a moving blood flow.

12. The ultrasonic imaging device according to claim 1, wherein the imaging processing unit GPU is further configured to perform a plane wave composite imaging in real time based on the plurality of groups of digital IQ data.

13. The ultrasonic imaging device according to claim 1, wherein the imaging processing unit GPU is further configured to combine a real-time gray-scale B-mode image with ultrasonic attenuation data, wherein the ultrasonic attenuation data is obtained according to the plurality of groups of digital IQ data.

14. The ultrasonic imaging device according to claim 1, wherein the imaging processing unit GPU is further configured to combine a real-time gray-scale B-mode image with sound velocity data, wherein the sound velocity data is obtained according to the plurality of groups of digital IQ data.

15. An ultrasonic imaging system, comprising:

a probe, comprising an excitation device and a plurality of sensors, wherein the excitation device is configured to excite a shear wave in a tissue and emit an ultrasonic wave, and each of the plurality of sensors is configured to sense a returned ultrasonic to form a corresponding analog radio frequency signal;

the ultrasonic imaging device according to claim 1, configured to form the image data of the ultrasonic imaging; and a display device, configured to display the image based on the image data.

* * * * *